Feb. 19, 1957 R. E. CARLSTROM 2,781,943
PRESSURE SEAL
Filed Jan. 29, 1954 2 Sheets-Sheet 1
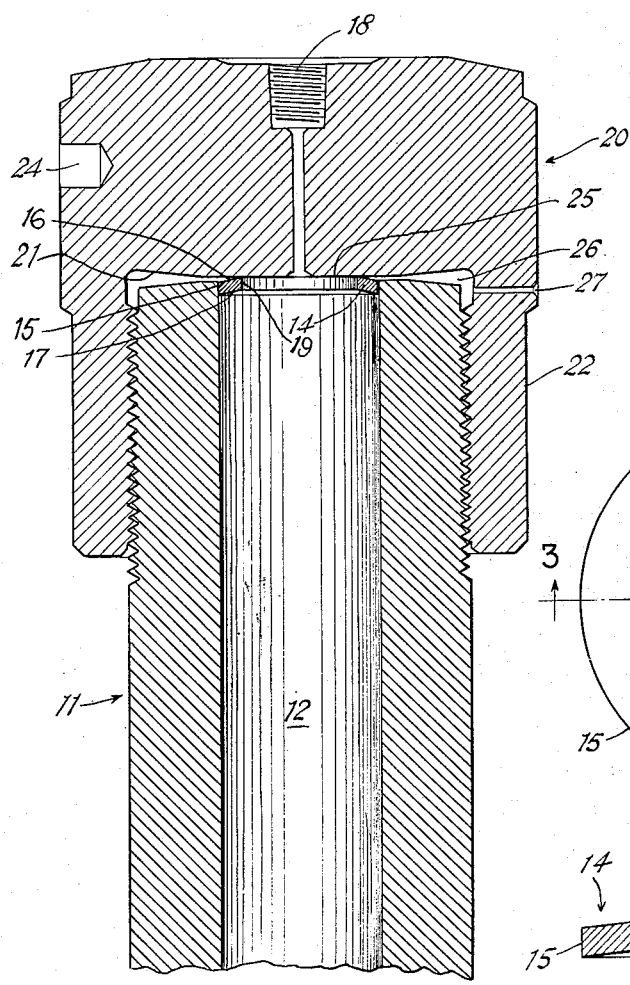
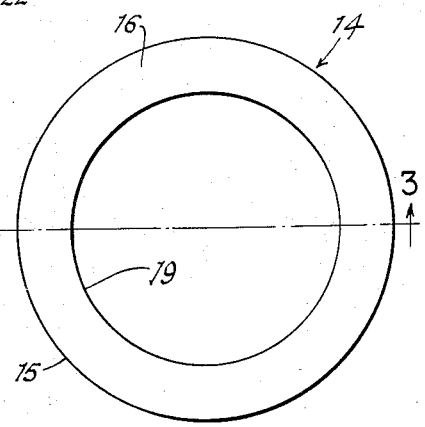
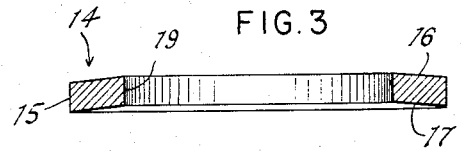
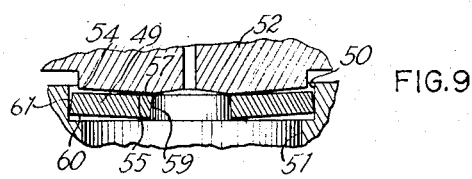
INVENTOR
Robert E. Carlstrom
BY
Ramsey, Chisholm & Hilder
ATTORNEYS Feb. 19, 1957   R. E. CARLSTROM   2,781,943
PRESSURE SEAL Filed Jan. 29, 1954   2 Sheets-Sheet 2

INVENTOR
*Robert E. Carlstrom*
BY
*Ramsey, Chisholm + Fielder*
ATTORNEYS

2,781,943

PRESSURE SEAL

Robert E. Carlstrom, Hamden, Conn.

Application January 29, 1954, Serial No. 407,129

10 Claims. (Cl. 220—46)

This invention relates to a pressure seal for an opening or port in a vessel adapted for containing fluid at elevated pressures.

In the storing of fluids at elevated pressures (3,000 p. s. i. to 60,000 p. s. i. or higher), there is a problem in providing a seal which is substantially leakproof at those pressures, can readily be unsealed to open the port and subsequently resealed, and which at the same time is simple and inexpensive to manufacture. The seal of the present invention, which is of simple construction, utilizes the pressure of the confined fluid for deforming an elastic metallic sealing ring into sealing relation, the sealing ring being not substantially stressed by application of the cap or closure and being stressed and deformed into sealing relationship by the pressure of the confined fluid.

The pressure seal of the present invention essentially comprises a cylindrical port for receiving an elastic metallic sealing ring, the clearance between the walls of the port and the cylindrical peripheral surface of the sealing ring being in the order of .001 inch. A cap or closure for the port holds the sealing ring against being blown from the port, the contour of the cap and of the sealing ring being such that the sealing ring is contacted by the cap in the zone removed from its periphery and the peripheral zone of the sealing ring being unsupported by the cap so that the sealing ring will be deflected by pressure within the vessel. Such deformation of the sealing ring causes the peripheral surface of the ring to seal tightly against the wall of the port, and the pressure within the vessel causes the portion of the sealing ring in contact with the cap to seal against the cap so as to provide a substantially fluid-tight seal for pressures up to 60,000 p. s. i. or higher.

A particular feature of the present invention is that the cap or closure need only be applied hand-tight and the sealing ring is not substantially stressed by the cap. Upon release of the pressure within the vessel, the sealing ring returns to substantially its initial shape, and the cap and sealing ring may be removed by hand or by use of ordinary hand tools, thus requiring no special tools for application or removal of the cap.

Among the objects of the present invention are to provide an improved, substantially fluid-tight seal for pressures of 3,000 p. s. i. to 60,000 p. s. i. or higher; to provide such a seal in which a sealing cap may be applied or removed without the use of special tools; to provide such a seal that is simple and economical to construct and which is durable and dependable in operation; and to generally improve fluid seals of the type described.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and the concept of my invention as distinguished from the pertinent prior art. The best form in which I have contemplated applying my invention is illustrated in the accompanying drawing forming part of this specification, in which:

Fig. 1 is a fluid seal according to a first form of the invention, the several parts making up the seal being shown in vertical section.

Fig. 2 is an enlarged plan view of the sealing ring of the seal of Fig. 1.

Fig. 3 is a vertical section of the sealing ring, taken on the line 3—3 of Fig. 2.

Fig. 9 is a view similar to Fig. 8 of the third form of pressure seal, the seal being under pressure.

Figure 4:
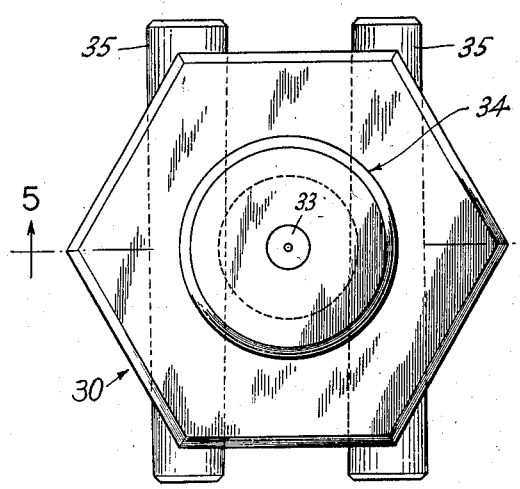
Fig. 4 is a top plan view of a pressure seal according to a second form of my invention.

Referring now to Fig. 1, a pressure vessel 11 is provided with a cylindrical port 12, the wall of the port preferably being machined to a reasonably smooth finish and the surface of the wall preferably being not more than about .001" out of round. The vessel 11 and the wall of the port may be formed of any metal or metal-like material having the requisite strength to withstand the pressure of the confined fluid.

A sealing ring 14 of the first form of the invention is shown in more detail in Figs. 2 and 3. This ring, which is made of relatively hard, resilient metal or metallike material, including steel and brass, has a cylindrical peripheral surface 15 which is machined to a reasonably good finish, the diameter of the sealing ring being such that it will fit within the cylindrical port 12, the diameter of the sealing ring being the same as the inner diameter of the port 12 of the vessel, with a tolerance in fit of about ±.001 of an inch.

The upper and lower surfaces 16 and 17, respectively, are frusto-conical, being elements of a cone making a very small angle (from 1° to 5°) with the horizontal, preferably about 3°. The contour 19 of the inner surface of the sealing ring may be cylindrical if desired, and the contour of the surface 17 of the ring may be generally flat, the contour of these particular surfaces not being important to the functioning of the ring.

The cap or closure 20 according to the first form of the invention is formed of metal of the necessary strength to withstand the pressure within the vessel, the cap having a generally circular surface 21 closing the port and a depending skirt 22 provided with internal threads for engaging cooperating threads on the exterior wall of the port 12 to hold the cap in position. If desired, one or more cylindrical holes 24 may be provided about the periphery of the cap 20 to receive a spanner for applying or removing the cap. A fluid inlet 18 for the vessel may extend axially of the cap 20.

The contour of the circuit surface 21 of the cap in the form of Fig. 1 comprises a flat central zone 25 for engaging against the junction of the upper and inner surfaces 16 and 19, respectively, of the sealing ring when the cap is applied to the vessel. The outer zone of the cap may be cut away as indicated to provide an annular chamber 26 extending about the inside of the cap and in communication with the upper surface 16 of the sealing ring. The chamber 26 is vented to the atmosphere by one or more vents or bores 27, the vents being sufficiently large in cross-sectional area to prevent any substantial back pressure building up against the sealing ring during initial sealing of the vessel, as will be explained.

The sealing ring 14 is supported in the end of the cylindrical port 12 against displacement. This ring may be supported by fitting tightly within the port 12 of the vessel as shown in Fig. 1, being held by stiff grease if necessary, or by being received within a counterbore as indicated in the second form of the invention.

The seal of the present invention is assembled as indicated in Fig. 1, the sealing ring 14 being inserted within the port 12 with the upper surface 16 of the ring exposed. The cap 20 is then threadedly engaged with the vessel 11 and need only be turned down hand-tight, the seal then being ready to receive pressure.

Upon fluid pressure being admitted to the vessel 11 from a supply of fluid held at elevated pressure, the seal may initially leak slightly, the vents 27 preventing any build-up of back pressure against the sealing ring 14. As the pressure within the vessel reaches a value of about 2,000 p. s. i. to 10,000 p. s. i., the greater pressure on the lower surface 17 of the ring will press the ring tightly against the flat central zone 25 of the cap 20 so as to form a fluid-tight seal between that surface of the cap and the junction of the upper and inner surfaces 16 and 19 of the sealing ring. At the same time, the pressure within the vessel will cause the sealing ring 14 to be more or less flattened into a plane, causing the sealing ring to expand slightly within the bore and causing the junction of the peripheral surface 15 and lower surface 16 of the sealing ring to form a fluid-tight seal against the wall of the cylindrical port 12. After the ring once seals, a further rise in pressure will only cause the sealing ring 14 to seal more tightly against the port 12 and the cap 20. The sealing ring of the present invention has withstood pressure in excess of 60,000 p. s. i. without detectable leakage.

Referring now to the second form of the invention shown in Figs. 4–7, the pressure vessel 30 there shown likewise has a cylindrical port 31 which may, if desired, be provided with a counterbore 32 for receiving the sealing ring, the fit of the sealing ring within the counterbore being the same as the fit of the sealing ring 14, previously described, within the vessel. The cap or closure 34 for the port 31 may be of the plug or breech-block type, having an axially extending inlet 33 and having a tapered or frusto-conical form fitting accurately within a similarly contoured portion at the end of the port 31. Tapered pins 35, 35 are received within similarly shaped, transversely extending bores 36, 36, the bores being partially within the closure 34 and partially within the wall of the port 31 so that the pins, when inserted within the bores, will hold the closure against displacement by pressure within the vessel.

The sealing ring 37, which is formed of hard, resilient metal or metallike material, is likewise frustoconical in shape and may be made from the same material as the ring 14. The sealing ring 37 may be identical in form to the sealing ring 14 previously described, or may be made with an upper surface 39 having a central zone 40 making an angle of about 1 degree with the horizontal and a peripheral zone 41 making an angle of about 3 degrees with the horizontal. The lower surface 42 may be formed to make an angle of as much as 5 degrees with the horizontal. The peripheral surface 44 of the sealing ring 37 is cylindrical, and the inner surface 45 of the ring may be cylindrical, the contour of the latter surface being relatively unimportant.

The interfitting of the closure 34 and the port 31 is such as to leave an annular chamber 46 in communication with the upper surface 39 of the sealing ring for relieving back pressure against the sealing ring, the chamber 46 being vented to the atmosphere by one or more vents or bores 47.

The seal of the present invention is assembled by placing the sealing ring 37 within the counterbore 32 of the port 31 and then inserting the closure 34 and inserting the pins 35, 35. As thus assembled, the plug 34 is resting against the junction of the upper and inner surfaces 39 and 45, respectively, of the sealing ring 37, but the sealing ring is not substantially deformed.

Upon admitting pressure to the vessel 30, the sealing ring becomes somewhat flattened by the pressure sealing against the closure and within the counterbore as described in connection with the first form of the invention and seals in a similar manner. It has likewise been found that complete sealing will occur at a pressure of about 2,000 p. s. i. to 10,000 p. s. i. and that the pressure may be increased to 60,000 p. s. i. or higher without detectable leakage.

Figure 8:
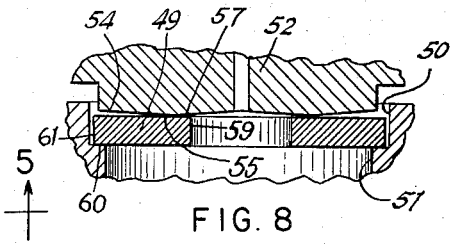
Fig. 8 is a fragmentary vertical section of a third form of pressure seal in accordance with the present invention.
Figure 5:
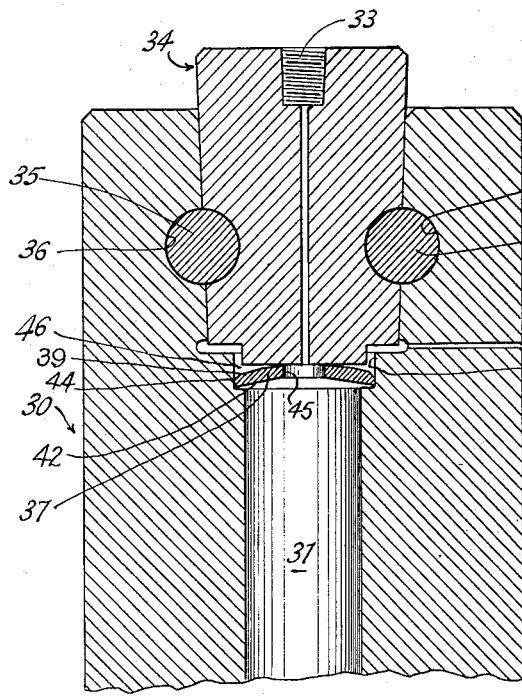
Fig. 5 is a vertical section of the seal taken on the line 5—5 of Fig. 4.
Figure 6:
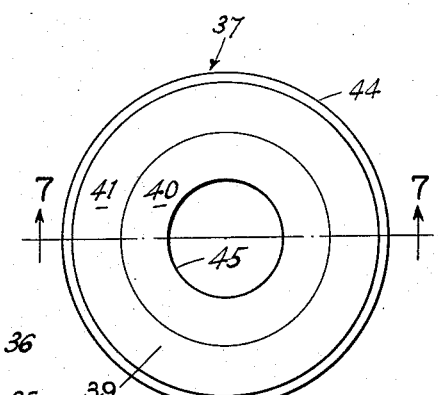
Fig. 6 is a plan view of the sealing ring of Figs. 4 and 5.
Figure 7:
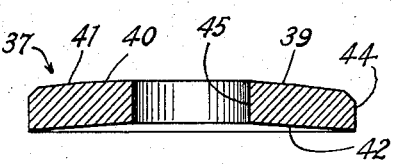
Fig. 7 is a vertical section, taken on the line 7—7 of Fig. 6.

In the previously described forms of the invention, the sealing rings were made of generally conical form. However, if preferred, the sealing ring 49 may be made flat as indicated in Figs. 8 and 9. It may likewise be received within a counterbore 50 of a port 51. A closure 52, which may be of either of the types previously described, has an inner sealing-ring-engaging surface 54 which may be conical in form so as to support the inner zone 55 of the sealing ring but to leave the outer zone free to be deformed more or less by pressure within the vessel. As pressure is admitted to the vessel, the sealing ring 49 of Fig. 8 will be pressed against the inner surface 54 of the closure 52, the junction of the upper and inner surfaces 57 and 59, respectively, of the sealing ring sealing against the surface 54 of the closure and the junction of the lower and cylindrical peripheral surfaces 60 and 61, respectively, sealing against the cylindrical surface of the counterbore 50, all as indicated in Fig. 9.

In all of the forms of the invention, the sealing ring is provided with a cylindrical peripheral surface which is received with not in excess of about .001" clearance within a cylindrical bore so that, upon deformation of the sealing ring under pressure, the seal will be effected about the periphery of the sealing ring due to the fact that the central zone of the sealing ring is supported and the peripheral zone is unsupported and free to be deformed by pressure within the vessel. When relatively hard, resilient metal, such as brass or steel, is used, the sealing ring will more or less return to its original contour upon the pressure within the vessel being relieved so that both the closure and the sealing ring may easily be removed.

It has been found that tight seals may be effected where the parts are given only a reasonably good finish. No grinding or precision machining of the parts to provide an absolutely true surface free from imperfections is required.

In order to provide a fluid-tight seal at elevated temperatures, it is desirable that the parts of the seal and particularly the sealing ring and the port of the pressured vessel have nearly the same coefficient of expansion so that the clearance between the periphery of the sealing ring and the cylindrical surface of the port is unaltered by change of temperature.

I claim:

1. A pressure seal for containing fluid within a vessel under high pressure, said seal comprising: a cylindrical port, a circular sealing ring of hard, resilient, metallike material fitting closely within said port, and a cap for closing said port, the inner face of the cap contacting the sealing ring in a zone removed from its outer periphery and the contour of the adjacent surfaces of the cap and sealing ring leaving a space above the outer peripheral portion of the sealing ring whereby the sealing ring is unsupported and free to be deflected in a direction axially of the port by pressure within the vessel, the space above the sealing ring being vented to the atmosphere and the sealing ring having a substantially cylindrical peripheral surface closely spaced from the cylindrical wall of the port whereby pressure within the vessel will deform the sealing ring and cause the central zone thereof to seal against the cap and a portion of the peripheral surface to seal against the cylindrical wall of the port.

2. A pressure seal for containing fluid within a vessel under high pressure, said seal comprising: a cylindrical port, a circular sealing ring of hard, resilient, metallike material fitting closely within said port, and a cap for closing said port, the inner face of the cap contacting the sealing ring in a zone removed from its outer periphery and the contour of the adjacent surfaces of the cap and sealing ring leaving the sealing ring unsupported and free to be deflected in a direction axially of the port by pressure within the vessel, the sealing ring having a substantially cylindrical peripheral surface fitting with the cylindrical wall of the port on the order of ±.001 inch whereby pressure within the vessel will deform the sealing ring and cause the central zone thereof to seal against the cap and a portion of the peripheral surface to seal against the cylindrical wall of the port.

3. A pressure seal for containing fluid within a vessel under high pressure, said seal comprising: a cylindrical port, a circular sealing ring of hard, resilient, metallike material fitting closely within said port, and a cap for closing said port, the sealing ring being generally frusto-conical in form and the inner face of the cap contacting the inner circumferential zone of the sealing ring, and the contour of the cap leaving the balance of the sealing ring unsupported and free to be deflected in a direction axially of the port so as to more or less flatten the sealing ring against the cap by pressure within the vessel, the sealing ring having a substantially cylindrical peripheral surface spaced from the cylindrical wall of the port not in excess of .001 inch whereby pressure within the vessel will deform the sealing ring and cause the inner circumferential zone thereof to seal against the cap and a portion of the peripheral surface to seal against the cylindrical wall of the port.

4. A pressure seal for containing fluid within a vessel under high pressure, said seal comprising: a cylindrical port, a circular sealing ring of hard, resilient, metal-like material fitting closely within said port, and a cap for closing said port, the sealing ring being generally frusto-conical in form and the inner face of the cap contacting the inner circumferential zone of the sealing ring, and the contour of the cap leaving the balance of the sealing ring unsupported and free to be deflected in a direction axially of the port so as to more or less flatten the sealing ring against the cap by pressure within the vessel, the space between the sealing ring and the cap being vented to the atmosphere and the sealing ring having a substantially cylindrical peripheral surface fitting with the cylindrical wall of the port on the order of ±.001 inch whereby pressure within the vessel will deform the sealing ring and cause the inner circumferential zone thereof to seal against the cap and a portion of the peripheral surface to seal against the cylindrical wall of the port.

5. A pressure seal for containing fluid within a vessel under high pressure, said seal comprising: a cylindrical port, a circular sealing ring of hard, resilient, metal-like material fitting closely within said port, and a cap for closing said port, the sealing ring being generally frusto-conical in form and the inner face of the cap contacting the inner circumferential zone of the sealing ring, and the contour of the cap leaving the balance of the sealing ring unsupported and free to be deflected in a direction axially of the port so as to more or less flatten the sealing ring against the cap by pressure within the vessel, the sealing ring having a substantially cylindrical peripheral surface closely spaced from the cylindrical wall of the port whereby pressure within the vessel will deform the sealing ring and cause the inner circumferential zone thereof to seal against the cap and a portion of the peripheral surface to seal against the cylindrical wall of the port.

6. A pressure seal for containing fluid within a vessel under high pressure, said seal comprising: a cylindrical port, a circular sealing ring of hard, resilient, metal-like material fitting closely within said port, and a cap for closing said port, the sealing ring being generally frusto-conical in form and the inner face of the cap being generally flat and contacting the inner circumferential zone of the sealing ring, and the contour of the cap and sealing ring leaving the balance of the sealing ring unsupported and free to be deflected in a direction axially of the port so as to more or less flatten the sealing ring against the cap by pressure within the vessel, the sealing ring having a substantially cylindrical peripheral surface fitting with the cylindrical wall of the port on the order of ±.001 inch whereby pressure within the vessel will deform the sealing ring and cause the inner circumferential zone thereof to seal against the cap and a portion of the peripheral surface to seal against the cylindrical wall of the port.

7. A seal as claimed in claim 6, in which elements of the sealing ring before deflection make an angle of about 3 degrees with a plane perpendicular with the axis of the ring.

8. A pressure seal for containing fluid within a vessel under high pressure, said seal comprising a cylindrical port, a circular sealing ring of hard, resilient, metal-like material fitting closely within said port, and a cap for closing said port, the sealing ring being generally flat and the portion of the inner face of the cap opposite the sealing ring being generally frusto-conical in form and contacting the inner circumferential zone of the sealing ring, the contour of the cap and sealing ring leaving the balance of the sealing ring unsupported and free to be deflected in a direction axially of the port due to pressure within the vessel, so as to cause the sealing ring to more or less take the conical form of the cap, the sealing ring having a substantially cylindrical peripheral surface fitting with the cylindrical wall of the port on the order of ±.001 inch whereby pressure within the vessel will deform the sealing ring and cause the inner circumferential zone thereof to seal against the cap and a portion of the peripheral surface to seal against the cylindrical wall of the port.

9. A pressure seal for containing fluid within a vessel under high pressure, said seal comprising a cylindrical port, a circular sealing ring of hard, resilient, metal-like material fitting closely within said port, and a cap for closing said port, the sealing ring being generally flat and the portion of the inner face of the cap opposite the sealing ring being generally frusto-conical in form and contacting the inner circumferential zone of the sealing ring, the contour of the cap and sealing ring leaving the balance of the sealing ring unsupported and free to be deflected in a direction axially of the port due to pressure within the vessel, so as to cause the sealing ring to more or less take the conical form of the cap, and the space between the sealing ring and the cap being vented to the atmosphere, the sealing ring having a substantially cylindrical peripheral surface closely spaced from the cylindrical wall of the port whereby pressure within the vessel will deform the sealing ring and cause the inner circumferential zone thereof to seal against the cap and a portion of the peripheral surface to seal against the cylindrical wall of the port.

10. A pressure seal for containing fluid within a vessel under high pressure, said seal comprising a cylindrical port, a circular sealing ring of hard, resilient, metal-like material fitting closely within said port, and a cap for closing said port, the sealing ring being generally flat and the portion of the inner face of the cap opposite the sealing ring being generally frusto-conical in form and contacting the inner circumferential zone of the sealing ring, the contour of the cap and sealing ring leaving the balance of the sealing ring unsupported and free to be deflected in a direction axially of the port due to pressure within the vessel, so as to cause the sealing ring to more or less take the conical form of the cap, the sealing ring having a substantially cylindrical peripheral surface closely spaced from the cylindrical wall of the port whereby pressure within the vessel will deform the sealing ring and cause the inner circumferential zone thereof to seal against the cap and a portion of the peripheral surface to seal against the cylindrical wall of the port.

References Cited in the file of this patent

UNITED STATES PATENTS

| | | |
|---|---|---|
| 2,226,494 | Jacocks | Dec. 24, 1940 |
| 2,278,882 | Jacocks | Apr. 7, 1942 |